(12) United States Patent
Clymer

(10) Patent No.: US 10,935,623 B2
(45) Date of Patent: Mar. 2, 2021

(54) CORRELATION SIDELOBE PROXIMITY SCREENING

(71) Applicant: BAE Systems Information and Electronic Systems Integration Inc., Nashua, NH (US)

(72) Inventor: Richard E. Clymer, Concord, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 210 days.

(21) Appl. No.: 16/120,008

(22) Filed: Aug. 31, 2018

(65) Prior Publication Data
US 2020/0072936 A1   Mar. 5, 2020

(51) Int. Cl.
    *G01S 3/28*   (2006.01)
(52) U.S. Cl.
    CPC .................................... *G01S 3/28* (2013.01)
(58) Field of Classification Search
    CPC .......... H01Q 21/28; G01S 3/02; G01S 3/023; G01S 3/14; G01S 3/146; G01S 3/28; G01S 3/30; G01S 3/04; G01S 3/10; G01S 3/8083; G01C 21/005
    See application file for complete search history.

(56) References Cited

U.S. PATENT DOCUMENTS

| 5,039,991 | A  | * | 8/1991  | Boese ..................... G01S 3/043 342/169 |
| 5,263,050 | A  | * | 11/1993 | Sutterlin ............ H04B 1/70712 375/142 |
| 10,694,148 | B1 | * | 6/2020  | Li ......................... G01C 21/005 |
| 2014/0192999 | A1 | * | 7/2014  | Sannino ................ G01S 3/8083 381/92 |
| 2015/0208253 | A1 | * | 7/2015  | Kim ...................... H04W 24/02 370/252 |

OTHER PUBLICATIONS

C.-S. Park et al., The Fast Correlative Interferometer Direction Finder using I/Q Demodulator, 2006 Asia-Pacific Conference on Communications, 5 pages, 2006 (Year: 2006).*
M.C. Bailey, Compact Wideband Direction-Finding Antenna, IEEE Antennas and Propagation Magazine, vol. 54(6), p. 44-68, Dec. 2012 (Year: 2012).*

* cited by examiner

*Primary Examiner* — Bernarr E Gregory
*Assistant Examiner* — Fred H Mull
(74) *Attorney, Agent, or Firm* — Sand, Sebolt & Wernow LPA; Scott J. Asmus

(57) ABSTRACT

A process of screening direction finding solutions to reduce the number of valid direction finding solution rejections while maintaining an acceptable level of wild bearings being reported utilizing the proximity of the correlation values of the highest correlation and second highest correlation given a correlation pattern of a detected signal of unknown origin.

19 Claims, 3 Drawing Sheets

CORRELATION SIDELOBE PROXIMITY SCREENING

STATEMENT OF GOVERNMENT INTEREST

This invention was made with government support under Contract No. F33657-99-D-0028, 2823195 awarded by the U.S. Air Force. The government has certain rights in the invention.

BACKGROUND

Technical Field

The present disclosure relates to a method of screening direction finding solutions to improve accuracy. More particularly, in one example, the present disclosure relates to a process of direction finding utilizing correlation sidelobe proximity screening to filter direction finding solutions. Specifically, in another example, the present disclosure relates to a process of screening direction finding solutions to enhance the accuracy of the direction finding system by reducing the number of valid solutions that are rejected and not reported.

Background Information

Direction finding is a process common to many applications, including navigation, search and rescue, wildlife tracking, and locating illegal transmitters. Direction finding processes are often utilized by military entities for target location, target acquisition, and tracking of enemy locations and movements. Nearly all modern militaries use some form of direction finding to guide their ships, aircraft, troops, and/or munitions in one or more ways.

Direction finding is typically done using an antenna or antenna array to detect a signal with an unknown direction of origin. Once a signal is detected, the signal characteristics are compared to a database populated with expected signal characteristics from simulated detections. It is rare that a detected signal of unknown origin matches exactly, i.e. 100%, to an expected signal characteristic from the database, therefore a correlation value is assigned based on the characteristics of the detected signal as compared to the database. This results in a series of correlations between detected signal characteristics and expected characteristics representing the probability that a signal originated from a particular direction. Most commonly, the correlation peaks coincide with degrees azimuth around a particular point, i.e. the antenna array. Current processes then analyze these correlation peaks and determine if they represent a valid direction finding solution or if they are more likely a wild bearing, which in this context is a signal that appears to originate from a particular direction, but no emitter exists or is transmitting from that direction at the time of the signal. The current standard practice is to predetermine a correlation threshold based on the particulars of the array installation and to reject any correlation that falls below the threshold as indicative of a wild bearing. Alternatively, if a correlation exceeds the threshold, it is reported as a valid direction finding solution.

The current process, particularly in military applications where a signal might represent an enemy emitter, tends to operate on the premise that no report is better than an incorrect report. That is to say that it is generally viewed as safer to reject a valid direction finding than it is to report a wild bearing. The result, however, is that current systems and processes have been shown to reject as much as 30% of valid direction finding solutions. Current attempts to reduce the number of valid solutions being rejected tend to result in the opposite, which is an unacceptable number of wild bearings being reported. Neither scenario is ideal.

SUMMARY

Issues continue to exist for direction finding solution screening processes, as they tend to over-report wild bearings and/or under-report valid direction finding solutions based on a predetermined correlation threshold. The present disclosure addresses these and other issues by providing a correlation screening system that can reduce the number of reported wild bearings and/or maintain the number of reported wild bearings at an acceptably low level while simultaneously increasing the number of valid direction findings being reported.

In one aspect, the present disclosure may provide a method of direction finding solution screening comprising: detecting a signal with an unknown direction of origin by an antenna array; comparing the detected signal with a pre-populated database of expected signal characteristics; assigning a correlation between the detected signal and the expected signal characteristics; identifying a first correlation peak value from a first correlation between the detected signal and the expected signal characteristics; comparing the first peak value to a minimum threshold; wherein if the first correlation peak value fails to meet the minimum threshold, then the first correlation peak value is rejected; wherein if the first correlation peak value meets or exceeds the minimum threshold, then the method further comprises: identifying a second correlation peak value from a second correlation between the detected signal and the expected signal characteristics; comparing the first correlation peak value with the second correlation peak value to determine a difference in peak values; and reporting an angle of arrival (AOA) correlated to the first correlation peak value as the direction of origin of the detected signal if the difference in peak values is greater than or equal to a predetermined proximity threshold. This exemplary embodiment or another exemplary embodiment may further provide wherein the first correlation value is the correlation value of the highest peak. This exemplary embodiment or another exemplary embodiment may further provide wherein the second correlation value is the correlation value of the second highest peak. This exemplary embodiment or another exemplary embodiment may further provide reporting the difference in peak values relative to the predetermined proximity threshold to a recipient while reporting the AOA. This exemplary embodiment or another exemplary embodiment may further provide further comprising: excluding all correlations that fall below the minimum threshold value. This exemplary embodiment or another exemplary embodiment may further provide wherein the minimum threshold value is selected from a range of correlation values of 0.90-0.97. This exemplary embodiment or another exemplary embodiment may further provide wherein the minimum threshold value is about 0.93. This exemplary embodiment or another exemplary embodiment may further provide wherein the predetermined proximity threshold is selected from a range of 0.02-0.04. This exemplary embodiment or another exemplary embodiment may further provide wherein the predetermined difference value is 0.03. This exemplary embodiment or another exemplary embodiment may further provide excluding all correlation peak values if the difference in peak values is less than the predetermined proximity threshold.

This exemplary embodiment or another exemplary embodiment may further provide providing the antenna array including a plurality of antennas operable to detect at least one of phase difference and amplitude difference of the detected signal. This exemplary embodiment or another exemplary embodiment may further provide networking the array through a plurality of combining components. This exemplary embodiment or another exemplary embodiment may further provide calibrating the array to detect a signal having at least one polarization. This exemplary embodiment or another exemplary embodiment may further provide calibrating the array to detect a signal having two or more polarizations. This exemplary embodiment or another exemplary embodiment may further provide processing the detected signal through a correlative interferometry direction finding (CIDF) process.

In another aspect, the present disclosure may provide a direction finding system comprising: an installation platform; an antenna array including a plurality of antennas on the installation platform; a database prepopulated with values representing expected signal characteristics of a detected signal; at least one non-transitory computer readable storage medium having instructions encoded thereon that, when executed by a processor, implements operations to determine the angle of arrival (AOA) of a detected signal with an unknown direction of origin, the instructions including: detect the signal with an unknown direction of origin; compare the signal to the database; assign a correlation between the detected signal characteristics and the expected signal characteristics; identify a first correlation peak value from a first correlation between the detected signal and the expected signal characteristics; compare the first peak value to a minimum threshold; identify a second correlation peak value from a second correlation between the detected signal and the expected signal characteristics; compare the first correlation peak value with the second correlation peak value to determine a difference in peak values; and report an angle of arrival (AOA) correlated to the first correlation peak value as the direction of origin of the detected signal if the difference in peak values is greater than or equal to a predetermined proximity threshold. This exemplary embodiment or another exemplary embodiment may further provide wherein the installation platform further comprises: at least one vehicle selected from a group comprising a tank, a truck, a ship, a projectile, a manned aircraft, an unmanned aircraft, and a helicopter. This exemplary embodiment or another exemplary embodiment may further provide wherein the predetermined proximity threshold is selected from a range of 0.02-0.04. This exemplary embodiment or another exemplary embodiment may further provide wherein the predetermined difference value is about 0.03. This exemplary embodiment or another exemplary embodiment may further provide excluding all correlation peak values if the difference in peak values is less than the predetermined proximity threshold.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
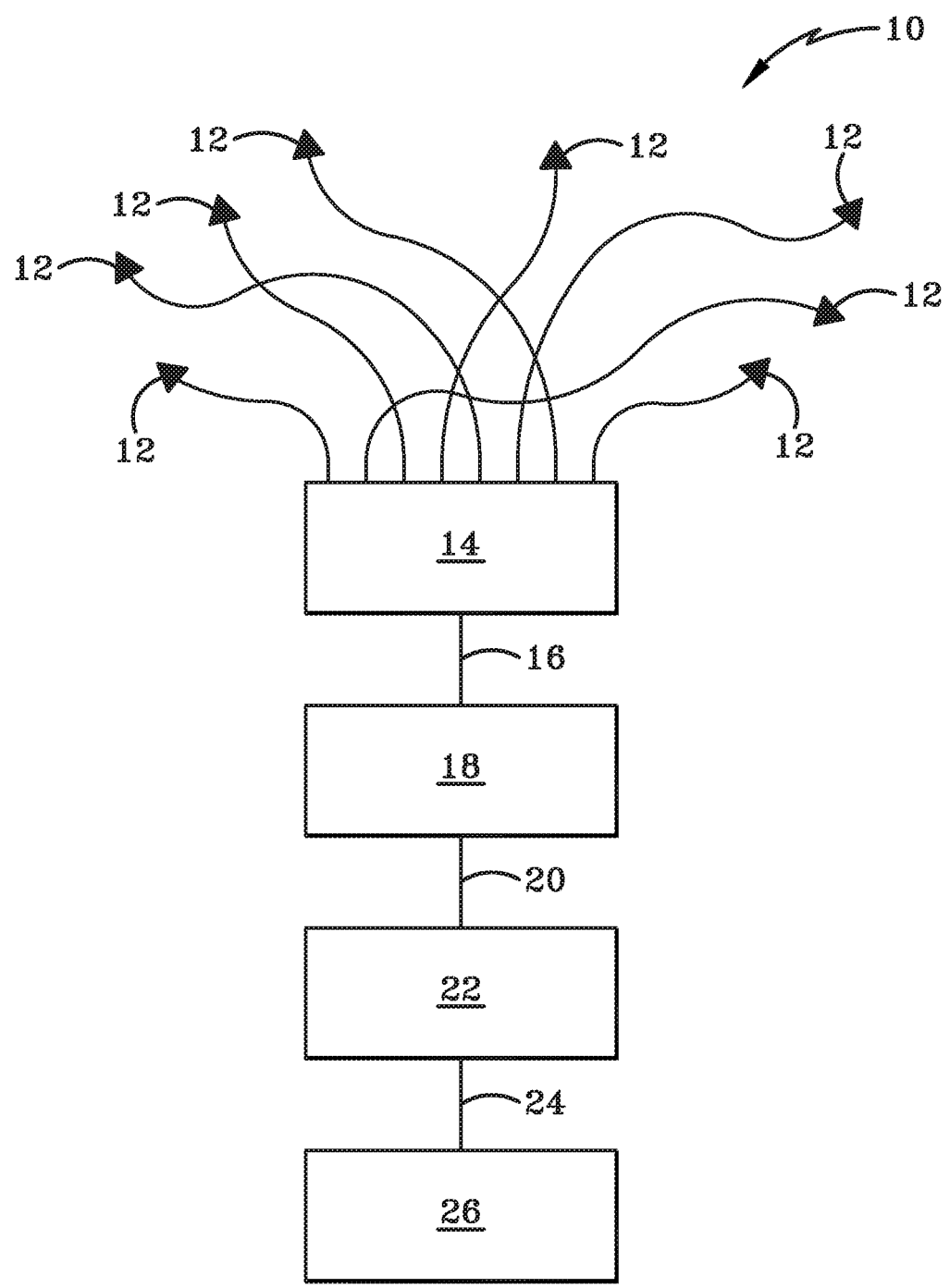
FIG. 1 is a schematic view of an antenna array and system of the present disclosure.

With reference to FIG. 1, an antenna array 10 can include one or more antennas 12, a network 14, at least one output 16, a receiver 18, a data connection 20, and a processor 22.

One or more arrays 10 can be installed on a vehicle, including ships, manned aircraft, un-manned aircraft, munitions, trucks or other land-based vehicles, or in stationary positions. Individual components or the array 10 as a whole can be miniaturized as necessary depending on the desired installation application without deviation of the scope herein. According to one example, two or more antennas 12 or arrays 10 may be installed on a single vehicle, such as one array 10 fore and one array 10 aft, thereby allowing discrimination between the respective arrays 10.

Antennas 12 can be monopole, dipole, or directional antennas, or any combination thereof and can be arranged in any desired configuration appropriate for the installation conditions. According to one aspect, antennas 12 can be operable to detect signals having one or more polarizations.

Network 14 may include one or more signal combining components, including phase shifters and/or phase combiners operable to accept alternating currents from the detected signal from the antennas 12 and to filter and/or enhance the signal as desired for the specific application. According to one non-limiting example, as incoming analog signals are detected, network 14 may perform pre-processing to condition, filter, amplify, and/or down-convert the incoming signals. According to another example, network 14 may include one or more analog-to-digital converters (A/D) that can convert the analog signals to digital signals. Network 14 can be installed downstream from the antennas 12 and may further include the at least one output 16 to direct the signal that has been filtered through the network 14 to the receiver 18.

Receiver 18 can be a computer or processor, or alternatively a computing system that can store and/or execute the process or processes disclosed herein. According to one non-limiting example, the receiver 18 may be a digital receiver that processes digital signals. According to another example, the receiver 18 may be an analog receiver that processes signals in the analog domain, wherein such signals are converted to the digital domain for processing by one or more processing units.

Alternatively, receiver 18 may be an intermediary between network 14 and processor 22. According to this aspect, receiver 18 can have a direct connection to processor 22 by way of data link 20.

Data link 20 can be a direct wired connection between receiver 18 and processor 22 that can allow unidirectional or bidirectional communications therebetween. According to another aspect, data link 20 can be wireless utilizing any suitable wireless transmission protocol.

Processor 22 can be a computer, a logic controller, a series of logics or logic controllers, a microprocessor, or the like that can store and/or execute the process or processes disclosed herein. According to one aspect, processor 22 can further include or be in communication with a storage medium. According to one aspect, receiver 18, data link 20, and processor 22 can be contained within a single unit and, in connection with the storage medium, can store and/or execute the processes disclosed herein. According to another aspect, receiver 18 can be remote from processor 22.

The operations of receiver 18, data link 20, and processor 22 are discussed further below.

According to one embodiment, one or more arrays 10 can be installed on a manned or unmanned aircraft and can be in direct communication with an onboard computer within the same aircraft. By way of one non-limiting example, array 10 can be installed in the nose of a manned aircraft and can have a communication link 24 to an operator interface 26 contained within the cockpit of the aircraft to allow the pilot to interact with the aircraft, particularly for this application, with the array 10. According to this example, the communications link 24 can be wired or wireless and can allow for bidirectional communications between the array 10 and the pilot.

By way of a second non-limiting example, array 10 can be installed in the nose of an unmanned, or remotely operated, aircraft and can have a communication link 24 to an operator interface 26 that is remote from the aircraft. According to this example, the communications link 24 can be wireless and can allow for bidirectional communications between the array 10 and the operator.

According to one aspect, the communications link 24 and operator interface 26 can be part of a single computer system that further includes receiver 18, data link 20, and processor 22.

According to another aspect, array 10 and/or the vehicle on which it is installed can be in communication with remote installations or processors which can assist or otherwise execute the process or processes described herein. By way of one non-limiting example, data can be communicated from array 10 to a remote base station or command center via communications link 24 for further processing.

Having thus described the array and installation, the operation of the array and its components will now be discussed.

Before a direction finding solution, defined as the angle of arrival (AOA) of a detected signal, may be generated and analyzed according to the present process, a database of expected signal characteristics may be created. This database can contain a series of signal measurements taken by the array 10, or a simulated version thereof, prior to being employed into an active detection environment. Specifically, an array 10 is installed (or simulated) in the environment in which it is intended to operate. Then, a series of signals can be emitted towards the array 10 from multiple angles which can then be detected by the array. The signal measurements then taken by array 10 can be stored in a database which can be kept on the storage medium in communication with processor 22. The signals directed at array 10 during the creation of this database can include multiple signals originating from various angles and having different polarizations, phases, amplitudes, and/or frequencies. By way of one non-limiting example, the database can be created to contain expected signal characteristics from signals having vertical and horizontal polarizations emitted at known intervals, such as every five degrees azimuth around the array 10. According to another aspect, signals can be emitted and the characteristics recorded at predetermined intervals in both azimuth and elevation.

According to one aspect, the database can be created using simulations of array 10 in the installation environment. These simulations can include 3-D modelling, scale models, partial installations, computer generated simulations, or other known modelling techniques. According to another aspect, array 10 can be installed in the actual installation environment and used to create the database of expected signal characteristics. For example, an array 10 can be installed on an aircraft which can be flown in an operational environment while signals are emitted and detected to create the database.

In operation, an array 10 can then be operable to detect a signal with an unknown direction of origin. The signal can be a radio frequency signal similar to those typically emitted by a radar installation or radar emitter located on a mobile platform. When array 10 detects a signal, certain data from that signal can be collected. According to one aspect, phase data, or phase difference data, can be detected and collected by array 10. According to another aspect, amplitude data, or amplitude difference data can be detected and collected by array 10. According to yet another aspect, both phase difference and amplitude difference data may be detected and collected by array 10.

Specifically, once a signal is detected by antennas 12, it can be processed through network 14 and sent through output 16 to receiver 18. According one embodiment, receiver 18 is an intermediary between network 14 and processor 22, the signal can be transformed by receiver 18 into usable data which can then be transmitted through data link 20 to processor 22.

According to another embodiment, receiver 18 and processor 22 can be the same unit and can both convert signal to usable data and further execute the process or processes described below.

Once signal data is sent to the processor 22, a direction finding solution may be generated according to the following process. The signal data can be compared with the stored database containing expected signal characteristics that has previously been created according to any of the processes above. This comparison may be done by way of correlations assigned to the comparisons between the detected signal characteristics and the expected signal characteristics at the prerecorded intervals. By way of one non-limiting example, the phase, amplitude, frequency, and/or polarization of a detected signal can be compared to the database and a correlation value can be assigned to the detected signal at the prerecorded degrees azimuth. This is best illustrated in graphical form, as shown in FIG. 2.

Figure 2:
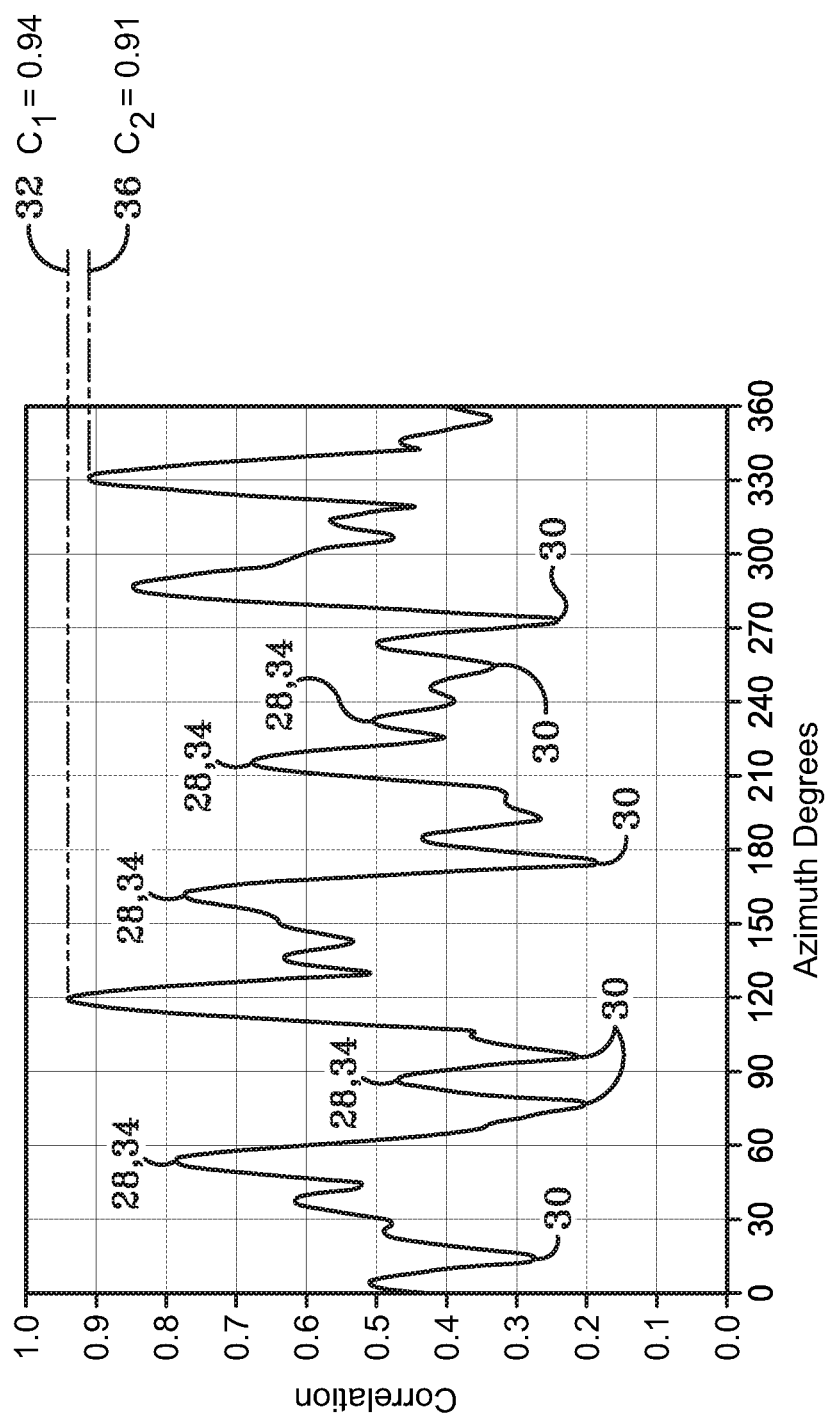
FIG. 2 is a graphical representation of an example of a correlation pattern of the present disclosure.

FIG. 2 shows a graph of a typical correlation pattern depicted with the y-axis representing correlation values measured in tenths from a value of 0, meaning no correlation, to a value of 1, with 1 being a perfect, or 100%, correlation. The x-axis in FIG. 2 then represents degrees azimuth around the horizon from 0 to 360 degrees. Each peak then represents the level of correlation a detected signal has with the expected characteristics from the database at each interval of azimuth.

In perfect environments where signals are exactly matched in polarization and are unobstructed and/or uncorrupted, a correlation of 1.0 to the expected signal characteristics database at a certain degree azimuth would indicate a 100% match to the database and would therefore indicate that specific azimuth angle as the direction of origin for the detected signal.

In real world applications, however, numerous corrupting factors can be present, including the structure design and other structural components of the array 10 and the installation environment itself. Additionally, corrupting factors exist in the external environment, such as obstacles, terrain, and atmospheric interference and potentially within the signal itself, for example, polarization variance between the actual detected signal and the expected signal characteristics. There may be further corrupting factors in hostile environments, such as intentional corruption from jamming and/or spoofing that can interfere with signal quality. Accordingly, due to these and other possible corrupting factors in real world applications, a correlation of 1.0 is nearly impossible to achieve. Therefore, the highest correlation value is generally viewed as potentially indicative of the AOA of the detected signal and can be further analyzed and/or screened to determine if it is a valid direction finding solution that should be reported.

With continued reference to FIG. 2, an example of a graph of correlation values is shown with a series of peaks 28 and valleys 30 representing the correlation between the detected signal and expected signal characteristics at a given angle. The highest peak 28 is designated the main peak 32 with all other peaks designated as side lobes 34. The highest side lobe is designated in FIG. 2 as reference 36. As illustrated in the example graph of FIG. 2, the main peak 32 occurs at 120 degrees azimuth with a correlation value, indicated as '$C_1$', of 0.94 while the highest side lobe 36 occurs at 330 degrees azimuth with a correlation value, indicated as '$C_2$', of 0.91.

As discussed previously, current screening processes preset a determination threshold, or minimum correlation threshold for all determined correlation values. By way of non-limiting example, a minimum correlation threshold might be set at 0.95, representing a 95% match between the detected and expected signal characteristics. Current processes then dictate that all direction finding solutions that fall below this minimum threshold of 0.95 are uniformly rejected with no further analyzation. Conversely, if the main peak 32 exceeds this threshold, it is reported as a valid direction finding solution. As illustrated in FIG. 2, the main peak 32 shows a correlation of 0.94 and would be rejected under this model, regardless of whether or not it is a valid solution.

As a general rule, raising the minimum threshold reduces the number of wild bearings being reported but increases the number of valid solutions being rejected while lowering the minimum threshold can reduce the number of rejected valid solutions, but at the cost of increasing the number of wild bearings being reported.

Simulations have shown that a minimum threshold of 0.97 can result in zero or near zero percent of reported solutions being wild bearings, but as many as 30-35% of valid solutions being rejected.

Figure 3:
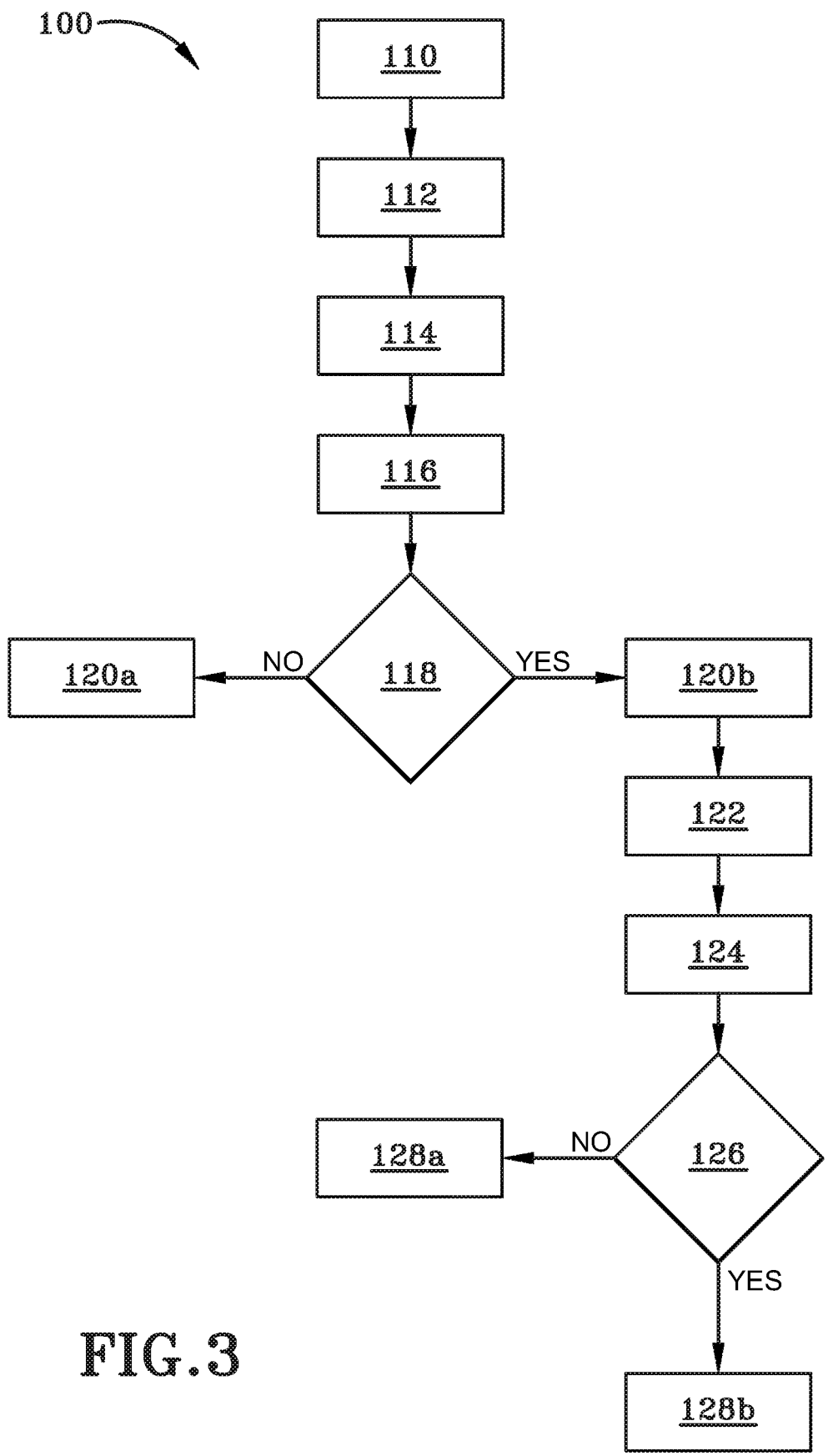
FIG. 3 is a flow chart and decision tree illustrating the process of the present disclosure.

With reference to FIG. 3, a flow chart and decision tree is provided showing the process (generally indicated at 100) of screening correlation patterns described herein.

Process 100, as depicted in FIG. 3, begins at the point that a signal is detected 110 by array 10. This process 100 assumes that the array 10 has been properly installed and calibrated according to the desired application, and that the database of expected signal characteristics has previously been generated and stored. Process 100 may further assume that a minimum correlation threshold has been previously determined and assigned and that a side lobe proximity threshold has likewise been determined and assigned. The value of a given threshold can vary depending on the application and installation demands for a given system.

According to one aspect, a minimum correlation threshold can be selected from a range between 0.90 and 0.97. By way of non-limiting example, this range is chosen because it allows process 100 to utilize a lower minimum correlation threshold value than what is used in current screening systems, as will be described in detail below. According to another aspect, a minimum correlation threshold of about 0.93 can be used.

According to one aspect, a side lobe proximity threshold can be selected from a range between 0.001 and about 0.05, 0.06, 0.07, 0.08, or 0.09. This range can optimally be a range between 0.02 and 0.04 as simulations have shown this range to result in fewer wild bearings being reported and fewer valid direction finding solutions being rejected. The chosen value of the side lobe proximity threshold may vary depending on the particular application and the tolerance for wild bearings. By way of non-limiting examples, in military applications, wild bearings are less tolerable (as discussed further below) whereas in search and rescue operations, it may be more tolerable to investigate more potential source directions.

According to one aspect, a side lobe proximity threshold of about 0.03 can be used. According to this aspect, 0.03 may be optimal for the broadest number of implementations as may provide a strong balance between reported wild bearings and rejected valid solutions.

According to one aspect, the side lobe proximity threshold can be static, i.e. set at a certain value, for example 0.03, and not changed. According to another aspect, the side lobe proximity threshold can be dynamic or variable. According to this aspect, the proximity threshold can be 0.03 but could change during operation depending upon the operation parameters. By way of non-limiting example, the proximity threshold in a military implementation may be 0.03 in enemy territory while being 0.02 while in friendly territory and can switch between the two as the installation platform moves in and out of the territories. According to another aspect, the proximity threshold may vary depending on the frequency of the detected signals. For example, for low-band frequencies, the threshold may be 0.03 while higher band frequencies may have a threshold of 0.04.

Accordingly, once a signal has been detected 110 by array 10, the characteristics of the detected signal are compared 112 to the stored database and correlations are assigned 114 as illustrated in FIG. 2 and described above. Next, the assigned correlations 114 may be analyzed to locate 116 the main peak 32 and compared 118 to the minimum correlation threshold to ensure that main peak 32 exceeds the threshold. If main peak 32 does not exceed the minimum threshold, it is rejected 120*a*.

Up to this point, process 100, in certain embodiments, resembles the current processes in that the main peak 32 is identified and rejected if it does not meet the minimum threshold. Previous processes, however, typically stop here with main peak 32 being rejected or reported based solely on the determination of whether or not main peak meets or exceeds the minimum threshold.

If main peak 32 does meet or exceed the minimum threshold, process 100 continues by comparing a second peak 30 to the main peak 32 to determine the difference in correlation value between the two peaks. According to one embodiment, process 100 identifies 120*b* the highest side lobe 36 (i.e. the second highest peak 30 overall) in the correlation pattern and comparing 122 the highest side lobe 36 to main peak 32 to determine 124 the difference in correlation value. The correlation difference can then be compared 126 to the preassigned side lobe proximity threshold. If the correlation difference is less than the side lobe proximity threshold, the direction finding solution is rejected 128*a* and no further action is taken. If the correlation difference exceeds the side lobe proximity threshold, the direction finding solution represented by main peak 32 may be reported 128*b*. According to one example, the direction finding solution may be reported to the operator who can then take appropriate action, for example, taking evasive maneuvers or steering towards a target. According to another example, the direction finding solution may be processed automatically and internally, such as on a projectile or unmanned aircraft that can use its processing capability to determine the response and/or action taken. According to another example, the direction finding solution may be communicated to a central location for further processing and or response.

Processor 22 can receive the signal from the receiver 18 via data link 20 and can execute process 100, including comparing the signal to the database (112), assigning correlations (114), identifying (116) main peak 32, comparing (118) main peak 32 to the minimum threshold, rejecting (120*a*) the solution or alternatively identifying (120*b*) the highest side lobe 36, comparing (122) the main peak 32 and highest side lobe 36, determining the difference (124) in correlation thereof, comparing the difference (126) to the side lobe proximity threshold, and either rejecting (128*a*) or reporting (128*b*) the solution. For reported solutions, processor can communicate with operator interface 26 via communications link 24 to notify the operator of the existence of the signal and the direction of origin (AOA) thereof.

According to one embodiment, processor 22 can employ or execute an algorithm or process known as correlative interferometry direction finding ("CIDF" or "the CIDF process") to achieve the above indicated steps in process 100. CIDF is a known process which can be utilized to determine a direction of origin for a detected signal.

According to another embodiment, processor 22 can utilize other known direction finding algorithms or processes to compare the signal to achieve the stated purpose.

In certain instances, use of process 100 may still eliminate all solutions that do not meet or exceed the minimum correlation threshold; however, process 100 can further reduce the number of wild bearings reported through the use of a lower minimum threshold to effectively lower the number of valid solutions being rejected while maintaining lowered levels of wild bearings being reported. By way of one non-limiting example, to have 0% reporting of wild bearings, previous processes would require a minimum threshold near a 0.97 correlation. This high threshold would result in as much as 30-35% of valid solutions being rejected. In one particular embodiment, the present process 100 may use a lower minimum threshold, such as 0.93, where less than 3% of valid solutions are rejected, while maintaining a near 0% reporting rate of wild bearings. According to one aspect, process 100 may be able to reduce the number of rejected valid solutions to as low as 1%, with virtually no increase to the reporting rate of wild bearings.

Process 100 may be further illustrated by way of the following non-limiting example: One might imagine a manned installation platform, such as an aircraft, operating in an environment with active enemy targets and/or defensive measures. The array 10 on the aircraft detects a signal (110) which is directed to processor 22 where it is compared to a database of expected signal characteristics (112) and assigned correlations (114). The main peak 32 is identified (116) and compared to the minimum threshold (118). If the main peak 32 does not meet or exceed the minimum threshold, the direction finding solution is rejected, the pilot of the aircraft is never notified of the signal detection, and the pilot continues on his/her current course.

If, however, the main peak 32 exceeds the minimum threshold, prior processes would notify the pilot of the signal detection and would report the direction finding solution to the pilot. If the signal emanates from a threat, and the solution reported is a wild bearing, the pilot may inadvertently steer the aircraft directly into the threat. Thus, prior processes would rather not report a valid solution than report a wild bearing. If the signal emanates from a target, however, the rejection of the valid solution may result in a missed target opportunity. Alternatively, if the pilot is headed directly towards a threat, the rejection of a valid solution may also prevent the pilot from enacting evasive maneuvers.

With process 100, if the main peak 32 meets or exceeds the minimum threshold, the highest side lobe 36 is identified (120*b*) and compared (122) to main peak 32 to determine the difference in correlation (124). The difference is then compared (126) to the side lobe proximity threshold. Only then is a determination made to report (128*b*) the source direction of the signal, i.e. the AOA of the signal, to the pilot, and only when the difference meets or exceeds the side lobe proximity threshold. If it does not, it is rejected (128*a*). Thus, the pilot is still not notified unless the solution meets or exceeds the minimum and the side lobe proximity thresholds, but the instances of wild bearings being reported are lower, as are the instances of rejecting valid solutions. Therefore, the pilot is given a more accurate picture of the environment and can better decide how to proceed away from danger and/or towards a desired target depending on his/her mission objectives. For instance, and in accordance with this example, if the pilot is instructed not to engage, the pilot may use the reported solutions to avoid engagement by steering away from the emitter direction. Conversely, if the pilot is actively engaging targets, he/she may use a reported solution to steer towards the emitter direction.

Although described herein using azimuth angles, it will be understood that process 100 may be employed for elevation angles or a combination of azimuth and elevation angles to provide direction finding solution screening at all angles around an array.

It will be understood that the polarization of the array 10 can be chosen as appropriate for the desired implementation and can vary depending on the parameters of that implementation. According to one aspect, the array 10 can be vertically polarized. According to another aspect, the array 10 can be horizontally polarized. According to yet another aspect, the array 10 can have multiple polarizations as chosen by a person of skill according to the installation parameters.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A direction finding system comprising:
an installation platform;
an antenna array including a plurality of antennas on the installation platform;
a database including expected signal characteristics of a detected signal;
at least one non-transitory computer readable storage medium having instructions encoded thereon that, when executed by a processor, implements operations to determine an angle of arrival (AOA) of the detected signal with an unknown direction of origin, the instructions including:
detect the signal with an unknown direction of origin;
compare the signal to the database;

assign a correlation between the detected signal characteristics and the expected signal characteristics;
identify a first correlation peak value from a first correlation between the detected signal and the expected signal characteristics;
compare the first correlation peak value to a minimum threshold;
wherein if the first correlation peak value meets or exceeds the minimum threshold, then the method further comprises:
identify a second correlation peak value from a second correlation between the detected signal and the expected signal characteristics;
compare the first correlation peak value with the second correlation peak value to determine a difference in correlation;
compare the difference in correlation to a side lobe proximity threshold; and
report an angle of arrival (AOA) correlated to the first correlation peak value as the direction of origin of the detected signal only if the difference in correlation is greater than or equal to the side lobe proximity threshold.

2. The system of claim 1 wherein the installation platform further comprises:
at least one vehicle selected from a group comprising a tank, a truck, a ship, a projectile, a manned aircraft, an unmanned aircraft, and a helicopter.

3. The system of claim 2 wherein the side lobe proximity threshold is selected from a range of 0.02-0.04.

4. The system of claim 1 wherein the instructions further include:
exclude all AOA reporting if the difference in correlation is less than the side lobe proximity threshold.

5. The system of claim 1 wherein the first correlation peak value is a highest peak and the second correlation peak value is a second highest peak.

6. The system of claim 1 wherein the instructions further include:
exclude every first correlation peak value that falls below the minimum threshold.

7. The system of claim 1 wherein the minimum threshold value is selected from a range of correlation values of 0.90-0.97.

8. The system of claim 1 wherein the instructions further include:
not reporting the AOA if the difference in correlation is less than the side lobe proximity threshold.

9. The system of claim 1 wherein the instructions further include:
provide the antenna array including a plurality of antennas operable to detect at least one of phase difference and amplitude difference of the detected signal.

10. The system of claim 9 wherein the instructions further include:
network the antenna array through a plurality of signal combining components.

11. The system of claim 1 wherein the instructions further include:
calibrate the array to detect a signal having at least one polarization.

12. The system of claim 1 wherein the instructions further include:
process the detected signal through a correlative interferometry direction finding (CIDF) process.

13. The system of claim 1 wherein the side lobe proximity threshold is dynamic.

14. A computer program product including one or more non-transitory machine-readable media having instructions encoded thereon that, when executed by a processor, cause the processor to determine a direction of origin of a detected signal, performing:
obtaining the detected signal from an antenna array;
comparing detected signal characteristics from the detected signal to expected signal characteristics from a database comprising at least one of prior signal characteristics of the detected signal and simulated signal characteristics;
assigning a correlation between the detected signal characteristics and the expected signal characteristics;
identifying a first correlation peak value from a first correlation between the detected signal characteristics and the expected signal characteristics;
comparing the first correlation peak value to a minimum threshold;
wherein if the first correlation peak value meets or exceeds the minimum threshold, further comprising:
identifying a second correlation peak value from a second correlation between the detected signal characteristics and the expected signal characteristics;
compare the first correlation peak value with the second correlation peak value to determine a difference in correlation;
comparing the difference in correlation to a side lobe proximity threshold; and
reporting an angle of arrival (AOA) correlated to the first correlation peak value as the direction of origin of the detected signal only if the difference in correlation is greater than or equal to the side lobe proximity threshold.

15. The computer program product of claim 14 wherein the expected signal characteristics comprise at least one of phase, amplitude, frequency, and polarization.

16. The computer program product of claim 14 wherein the expected signal characteristics are stored according to at least one of azimuth and elevation.

17. The computer program product of claim 14 wherein the detected signal characteristics comprise at least one of phase difference and amplitude difference.

18. The computer program product of claim 14 wherein the minimum threshold value is 0.93.

19. The computer program product of claim 14 wherein the side lobe proximity threshold is 0.03.

* * * * *